US006799485B1

(12) United States Patent
Kawamoto et al.

(10) Patent No.: US 6,799,485 B1
(45) Date of Patent: Oct. 5, 2004

(54) VEHICLE ENGINE

(75) Inventors: Yuichi Kawamoto, Akashi (JP); Shinji Shuto, Kakogawa (JP); Kiyohito Takano, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 10/407,193

(22) Filed: Apr. 7, 2003

(51) Int. Cl.[7] .......................... F16H 3/08; F16H 59/00; F02F 7/00; F02B 75/32

(52) U.S. Cl. ....................... 74/335; 74/329; 123/197.1; 123/195 C

(58) Field of Search .......................... 123/195 C, 195 P, 123/197.1, 197.5; 74/325, 329, 335

(56) References Cited

U.S. PATENT DOCUMENTS 3,578,760 A * 5/1971 Shinmura .................... 74/359
4,920,825 A * 5/1990 Okazaki et al. ......... 123/195 C
5,558,059 A * 9/1996 Yoshinaga et al. ...... 123/198 E
5,636,608 A * 6/1997 Shichinohe et al. ..... 123/197.1
6,510,916 B2 * 1/2003 Hori et al. .................. 180/374
2002/0043237 A1 * 4/2002 Nomura et al. .......... 123/197.1
2003/0075138 A1 * 4/2003 Hori et al. ............... 123/197.5

FOREIGN PATENT DOCUMENTS

JP Y2 64-3872 2/1989

* cited by examiner

*Primary Examiner*—Roger Pang
(74) *Attorney, Agent, or Firm*—Oliff & Berridge, PLC

(57) ABSTRACT

A crank case 20 has a mission chamber 52 at a rear part, and a generator chamber 58 and a clutch chamber 59 are provided on both side of the crank case 20 in the direction of the crank shaft. The mission chamber 52 houses a transmission gear mechanism. The mission chamber 52 is bulged to one side in the direction of the crank shaft. A reverse idle gear 90 is disposed in the bulged part of the mission chamber 52. The reverse idle gear 90 is projected through a partition wall between the mission chamber 52 and the generator chamber 58 toward the generator chamber 58. The reverse idle gear shaft 44 has both ends supported by the left end wall 53*a* of the mission chamber and a shaft support member 66 secured to the end wall 53*a*.

10 Claims, 10 Drawing Sheets

VEHICLE ENGINE

FIELD OF THE INVENTION

The present invention relates to an engine to be mounted on a vehicle, such as straddle-type four-wheeled all terrain vehicles or two-wheeled motorcycle, more specifically a vehicle engine having an reverse gear train.

RELATED BACKGROUND ART

FIG. 10 shows a transmission of a conventional engine of a vehicle for driving on rough terrain, which has the reverse gear train. A reverse idle gear shaft 202 disposed in a transmission chamber 201 is extended along a full left-to-right length of a crank case 203 and is rotatably supported on the left and the right side walls 204*a*, 204*b* of the transmission chamber 201 by means of bearings 205. A smaller-diameter reverse idle gear 210 is disposed on the left end of the reverse idle gear shaft 202, and a larger-diameter reverse idle gear 211 is disposed on the right end. The larger-diameter reverse idle gear 211 engages a low gear 215 of a transmission input shaft 212, and the smaller-diameter idle gear 210 engages the reverse gear 216 of a transmission output shaft 213.

In the structure shown in FIG. 10, the reverse idle gear shaft 202 is supported on the left and the right ends of the transmission chamber 201, extended fully therebetween. Two reverse idle gears 210, 211 are mounted on the left and the right ends of the reverse idle gear shaft 202. The low gear 215 on the transmission input shaft 212 is longitudinally elongated to engage the larger-diameter reverse idle gear 211. This structure makes the reverse idle gear shaft 202 unnecessarily long and adds weight. Furthermore, even in disposing the reverse idle gears 210, 211 near the left and the right bearings 205, 205 to prevent the generation of vibrations due to bending, the excessive length of the reverse idle gear shaft 202 itself is a cause of gear noise.

On the other hand, in reducing the shaft length of the reverse idle gear shaft 202, the reverse idle gears 210, 211 are disposed at an intermediate location between the left and the right crank case members 204*a*, 204*b*, which restricts the transmission gear trains on the respective transmission shafts 212, 213 and hinders efforts to make the transmission gear arrangement more compact.

In contrast to the structure having two reverse idle gears as described above, the transmission as described in, e.g., the specification of Japanese Utility Model Publication No. 3872/1989, has one reverse idle gear, and the reverse idle gear is rotatably mounted on a shift cam shaft supported on the left and the right end walls of the crank case.

However, one reverse idle gear restricts the reduction gear ratio more than two reverse idle gears and makes it difficult to allow for a large reduction gear ratio. When a large reduction gear ratio is forced, the diameter of the reverse idle gear becomes too large, which makes the transmission uselessly large. Terrain

SUMMARY OF THE INVENTION

In view of the above-described problem the present invention has been made. An object of the present invention is to provide a vehicle engine comprising a transmission having one reverse idle gear, in which a configuration of the engine, an arrangement of the reverse idle gear and a structure for supporting the reverse idle gear shaft are contrived to thereby compact and lighten the transmission and the engine.

The present invention relates to a vehicle engine comprising a crank case including a crank chamber and a transmission chamber; a crank shaft disposed in the crank chamber; and a transmission gear mechanism disposed in the transmission chamber, including an reverse idle gear shaft and one reverse idle gear mounted on the idle gear shaft; and cover chambers housing a generator and a clutch being disposed respectively on both sides of the crank chamber in the direction of the crank shaft, the reverse idle gear having a part projected from the transmission chamber to one of the cover chambers.

According to the present invention, the interior space of the cover chamber can be utilized as a part of the space where the reverse idle gear is dipsoed, whereby even when the reverse idle gear has a larger diameter, the transmission chamber and the engine can be kept compact.

It is preferable that the transmission chamber is projected beyond the crank chamber toward one end of the crank shaft, and the reverse idle gear being disposed in the projected portion of the transmission chamber, and a gear insertion hole is formed in a partition wall between the transmission chamber and the cover chamber, and the part of the reverse idle gear is projected to the cover chamber through the gear insertion hole.

In this structure, the bulged part of the transmission chamber in the direction of the crank shaft is utilized to dispose the reverse idle gear, and a part of the reverse idle gear is projected toward the cover chamber neighboring the bulged part, whereby the configuration of the cover chamber and the transmission chamber, and their mutual positional relationship are utilized to arrange the reverse idle gear without uselessly increasing the space. Furthermore, the partition wall between the cover chamber and the transmission chamber can be effectively utilized. The engine can be made more compact.

It is preferable that a shaft support member is secured to an end wall of the transmission chamber on the side of one end of the crank shaft, and the reverse idle gear shaft with the reverse idle gear mounted thereon has both ends supported by the end wall of the transmission chamber and the shaft support member.

In this structure, the reverse idle gear and the reverse idle gear shaft can be easily mounted on the crank case, and the reverse idle gear shaft can decrease the length, so that the weight and the space for arranging the shaft are decreased. The reverse gear shaft is shortened and has both ends supported, whereby the bending moments of the shaft generated in the operation can be small, which can decrease-gear noises.

It is preferable that the transmission gear mechanism further includes a shift rod, and the shift rod is supported by the shaft support member supporting the reverse idle gear shaft.

In this structure, the reverse gear shaft and the shift rod are supported by one shaft support member, whereby a part number of the transmission can be decreased, and accordingly the weight can be decreased.

The present invention relates to a vehicle engine comprises a crank case including a crank chamber and a transmission chamber; a crank shaft having a center axis disposed in the crank chamber; a transmission gear mechanism disposed in the transmission chamber and including a transmission output shaft having a center axis, a transmission input shaft having a center axis, a reverse idle gear shaft having a center axis with a reverse idle gear mounted thereon, and a change drum shaft having a center axis, cover chambers housing a generator and a clutch being disposed respectively on both sides of the crank chamber in the direction of the crank shaft, the transmission input shaft being arranged one side of a straight line interconnecting the center axis of the crank shaft and the center axis of the transmission output shaft, and the change drum shaft being arranged on the other side of the straight line interconnecting the center axis of the crank shaft and the center axis of the transmission output shaft, and the reverse idle gear shaft is disposed in a region surrounded by the center axis of the crank shaft, the center axis of the transmission output shaft, the center axis of the transmission input shaft and the center axis of the change drum shaft.

According to the present invention, the space surrounded by the above-described four shafts is effectively utilized to position the reverse idle gear shaft, whereby the transmission can be compact.

It is preferable that the reverse idle gear shaft and the change drum shaft are arranged below a straight line interconnecting the transmission input shaft and the transmission output shaft.

In this structure, the space of an upper part in the transmission chamber can be used as a space for arranging a starting mechanism of the engine, such as a starting motor, etc.

It is preferable that the transmission gear mechanism includes a shift rod, and the reverse idle gear is arranged, partially overlapping the shift rod and the change drum as viewed in the direction of extension of the crank shaft.

In this structure, the reverse idle gear is positioned, overlapping the shift rod and the change drum as viewed in the direction of the shaft, whereby the transmission and engine having an reverse gear train can have smaller vertical and horizontal dimensions as viewed in the direction of the shaft and therefore the engine can have smaller weights.

It is preferable that a shaft support member is secured to an end wall of the transmission chamber on the side of one end of the crank shaft, the reverse idle gear shaft with an reverse idle gear mounted thereon has both ends supported by the end wall of the transmission chamber and the shaft support member, and the shift rod is supported by the shaft support member.

In this structure, the reverse idle gear and the reverse idle gear shaft can be easily mounted. The reverse idle gear shaft is shortened to thereby decrease the weight and the space for arranging the shaft. The reverse idle gear shaft is shortened and has both ends supported, whereby bending moments of the reverse idle gear shaft in the operation can be small, which prevents the generation of the gear noises.

It is preferable that the reverse idle gear of the reverse idle gear shaft has a part projected out of the transmission chamber into the cover chamber housing the generator.

In this structure, the cover chamber housing the generator is used as a part of the space for arranging the reverse idle gear, whereby an empty space for arranging the reverse idle gear can be easily ensured.

It is preferable that the transmission input shaft and the transmission output shaft have respective shift sleeves for shifting the gears, and all of the shift forks which are engaged with the shift sleeves of the transmission input shaft and the transmission output shaft, are mounted on said shift rod.

In this structure, a number of the shift rods can be minimized, which also can make the transmission compact and light.

The above and further objects and features of the present invention will be more fully apparent from the following detailed description with accompanying drawings.

DESCRIPTION OF THE PREFERRED EMBODIMENTS

Vehicle for Engine to be Mounted on

Figure 1:
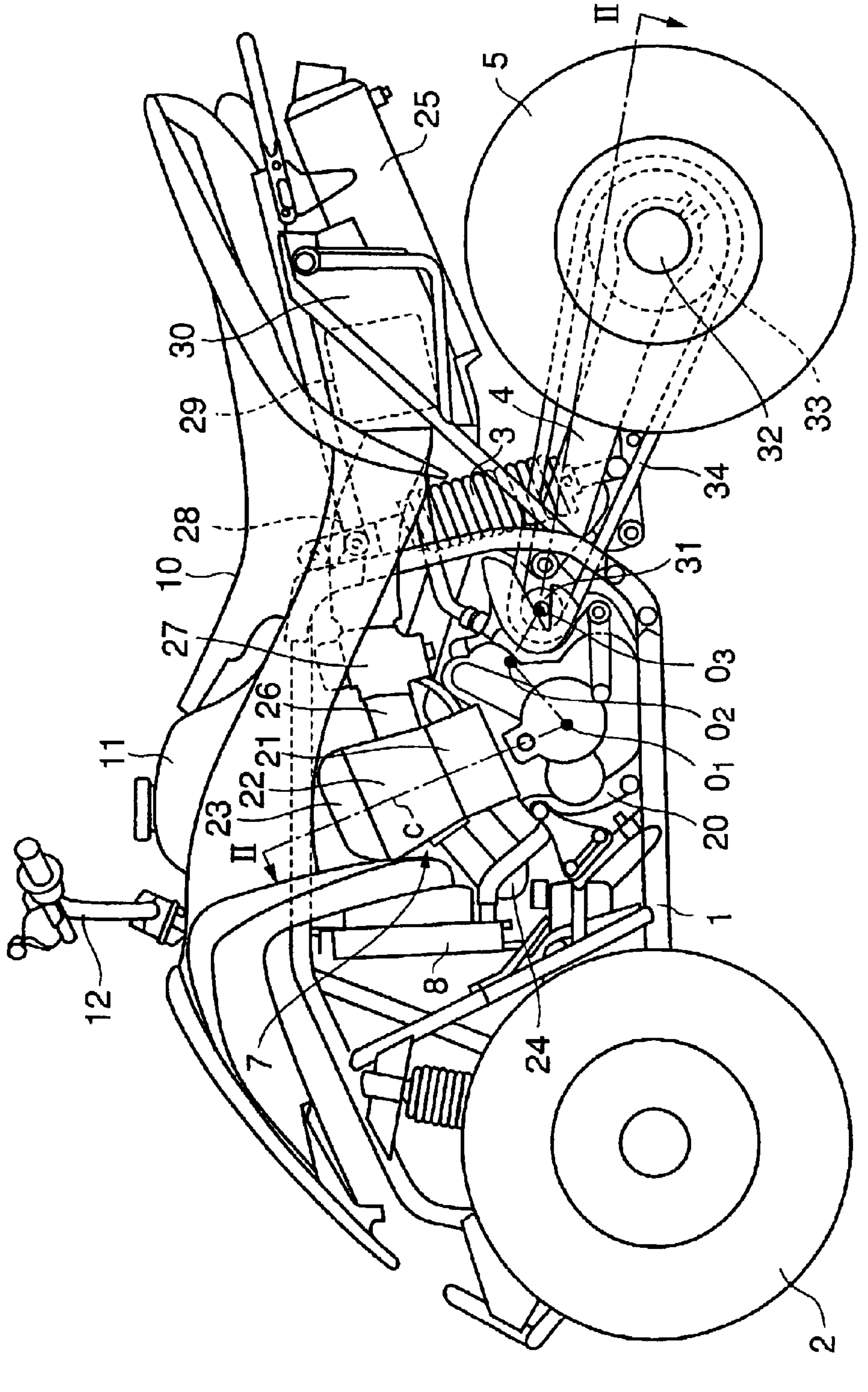
FIG. 1 is a side view of a straddle-type four-wheeled all terrain vehicle with a vehicle engine according to an embodiment of the present invention.

FIG. 1 shows a straddle-type of four-wheeled all terrain vehicle having a single cylinder four cycle engine to which the present invention is applied. A pair of left and right front wheels 2 are disposed on a front part of a body frame 1 of the vehicle. A pair of left and right rear wheels 5 are disposed on a rear part of the body frame 1 by means of a swing arm 4. The swing arm 4 is flexibly supported by a shock absorber 3. An engine 7, a radiator 8, etc. are mounted in the body frame 1. A saddle seat 10, a fuel tank 11, a bar-shaped handle 12, etc. are mounted on the upper part of the body frame 1.

The engine 7 includes a crank case 20, and a cylinder 21, a cylinder head 22 and a head cover 23 which are sequentially interconnected to the crankcase 20. An exhaust pipe 24 is connected to an exhaust port in the front side of the cylinder head 22, and the exhaust pipe 24 is curved to the right and extended rearward to be connected to a muffler 25. A air intake pipe 26 is connected to a intake port on the back side of the cylinder head 21. The air intake pipe 26 is connected to an air cleaner box 30 disposed at a rear part, which includes a carburetter 27, a suction duct 28 and an element 29.

The vehicle uses a chain drive system. A drive chain 34 is wound between an output sprocket 31 disposed on the left side of the engine 7 and a sprocket 33 of a rear wheel shaft 32. The rear wheels 5 are driven by the drive chain 34. In FIG. 1, reference numbers 01, 02, 03 respectively represent a crank shaft center axis, a transmission input shaft center axis and a transmission output shaft center axis of the engine 7.

Shell of Engine

Figure 2:
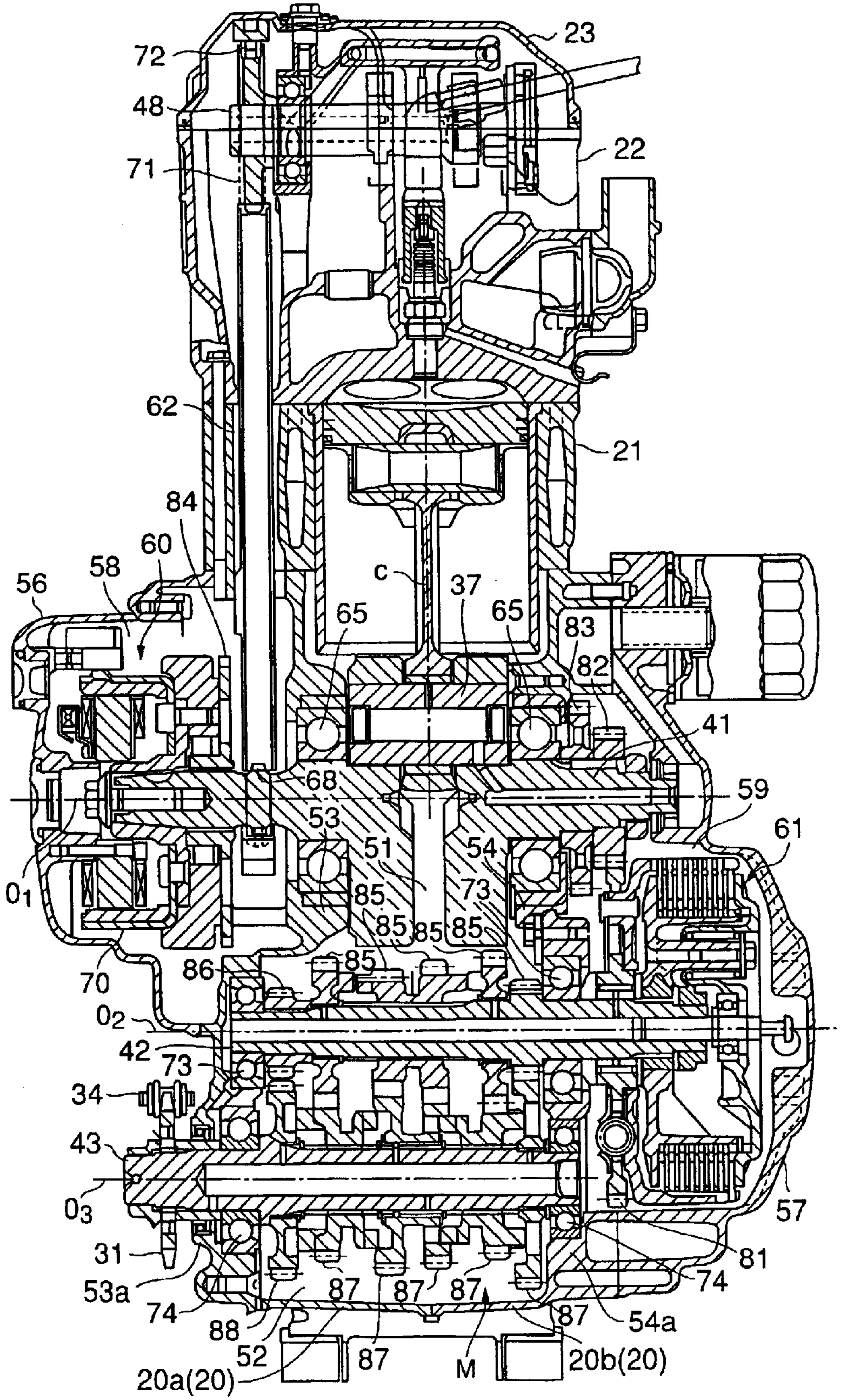
FIG. 2 is an enlarged development of a section of the engine shown in FIG. 1 along line II—II.

FIG. 2 is an enlarged development of a section along line II—II in FIG. 1 and is a development of a section along a cylinder central line C, the crank shaft center axis 01, the transmission input shaft center axis 02 and the transmission output shaft center axis 03. In FIG. 2, the crank case 20 is bisected into a left and a right crank case members 20*a*, 20*b*. Both the crank case members 20*a*, 20*b* are combined with each other at abutting surfaces which is plane passing through the cylinder central line C and perpendicular to the crank shaft center axis 01. The crank case 20 has a forward part which is a crank chamber 51 housing the crank shaft 41, and a rear part which is a mission chamber (transmission chamber) 52 housing a mission (transmission) M. A left end wall 53*a* of the mission chamber 52 is bulged to the left with respect to a crank case left end wall 53.

Covers 56, 57 are fastened respectively to the left and the right ends of the crank case 20. A cover chamber 58 in the left cover 56 houses a generator 60, and a cover chamber 9 in the right cover 57 houses a multi-plate friction-type clutch 61.

In order to discriminate the left and right covers 56, 57 and the cover chambers 58, 59 respectively from each other, the left cover 56 and the cover chamber 58, and the right cover 57 and the cover chamber 59 will be called respectively the generator cover and the generator chamber, and the clutch cover and the clutch chamber in the following description.

Power Transmission System

The crank shaft 41 is rotatably supported on the left end wall 53 and a right end wall 54 of the crank case 20 by means of bearings 65, 65 and is longitudinally bisected. A left and a right crank shaft part are combined with a crank pin 37. The left end part of the crank shaft 41 is projected toward the generator chamber 58, and a sprocket 68 for a cam chain 71 is provided in the left end part, and a starting gear 84 and the rotor (fly wheel) 70 of the generator 60 are secured to the left end part. The cam chain 71 wound on the cam chain sprocket 68 is passed through a cam chain tunnel 62 formed in the cylinder 21 and the cylinder head 22 into the head cover 23 so that the cam claim 71 is wound on a sprocket 72 of a cam shaft 48.

The right end part of the crank shaft 41 is projected toward the clutch chamber 59, and a crank gear 82 which is to be meshed with a clutch gear 81 of the clutch 61, and a balancer drive gear 83 are secured to the right end part.

Mission (Transmission Gear Mechanism)

The mission (transmission) M has a gear train of five forward shifts and one rear shift which can be freely shifted. That is, the mission M has a transmission input shaft 42 and a transmission output shaft 43. The transmission input shaft 42 is supported on the left end wall 53*a* and a right end wall 54*a* of the mission chamber 52 by means of a pair of left and right bearings 73. Respective input forward transmission gears 85, i.e., sequentially from the right side, a 1st forward, a 5th forward, a 3rd forward a 2$^{nd}$ forward and 4th forward gear, are mounted on the transmission input shaft 42, and an input reverse transmission gear 86 is mounted on the left end of the transmission input shaft 42. The right end part of the transmission input shaft 42 is projected toward the clutch chamber 59, and connected to a hub of the clutch 61.

The transmission output shaft 43 is supported on the left and the right end walls 53*a*, 54*a* by means of a pair of left and right bearings 74. The left end part of the transmission output shaft 43 is projected out of the mission chamber 52 to the left. The output sprocket 31 for driving rear wheels is secured to the left end part of the transmission output shaft 43. Respective output forward transmission gears 87, i.e., sequentially from the right, a 1st forward, a 5th forward, a 3rd forward, a 2nd forward and a 4th forward gear, are mounted on the transmission output shaft 43. An output reverse transmission gear 88 is mounted on the left end part of the transmission output shaft 43. The respective output forward transmission gears 87 are respectively in mesh with the input forward transmission gears 85.

Figure 3:
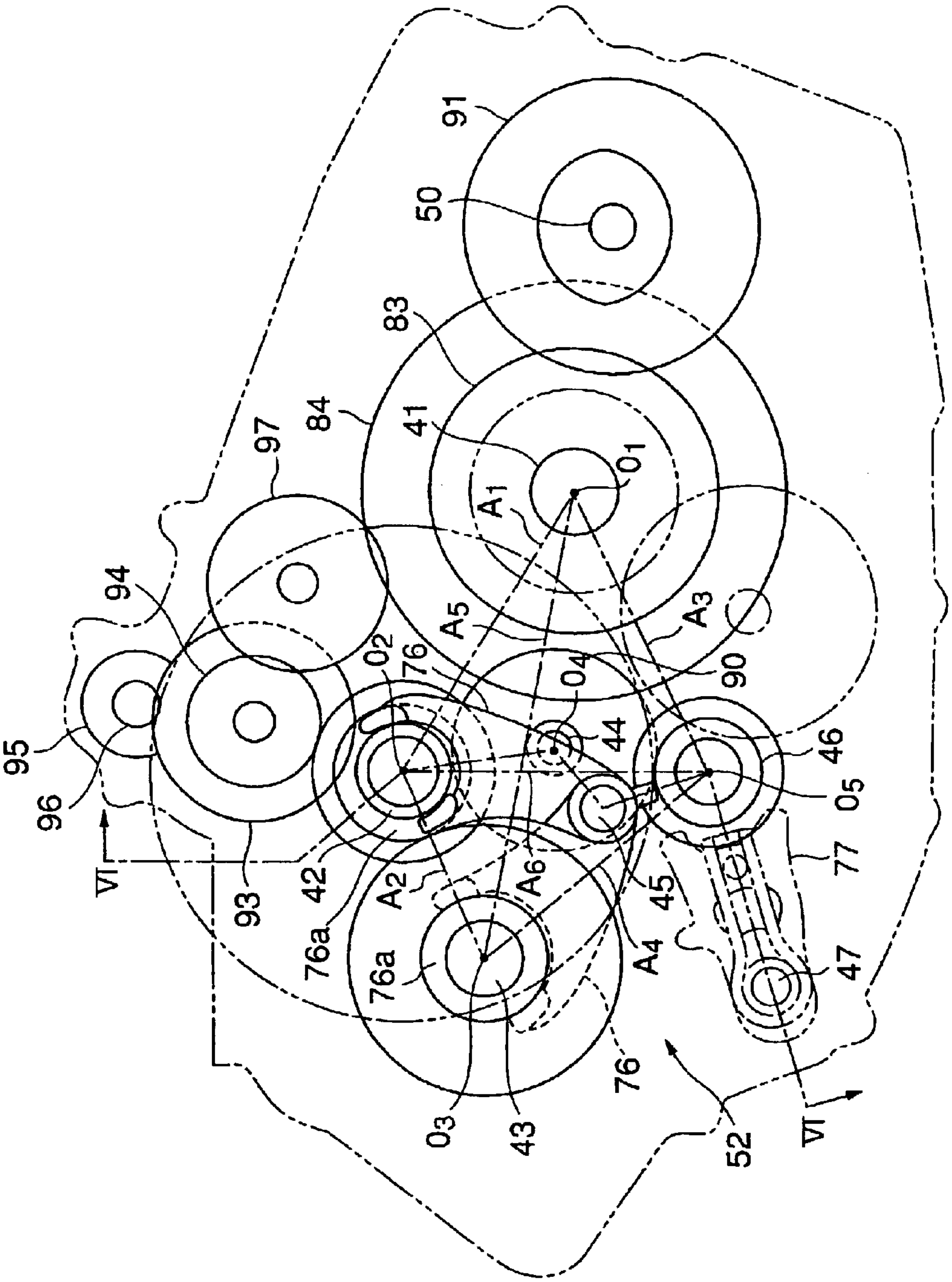
FIG. 3 is a right side view of the engine, which shows various shafts and an arrangement of gears in the engine.

FIG. 3 shows an arrangement of shafts and gears in the engine. The transmission output shaft 43 is located at a rear part inside the mission chamber 52, and the shaft center axis 03 of the transmission output shaft 43 is positioned a little higher with respect to the crank shaft center axis 01. The transmission input shaft 42 is positioned between the crank shaft 41 and the transmission output shaft 43 and positioned higher with respect to a line A5 interconnecting the crank shaft center axis 01 and the transmission output shaft center axis 03. Between the crank shaft 41 and the transmission output shaft 43 and below the line A5, a shift rod 45 and a change drum 46 are arranged in the stated order, and a change shaft 47 is positioned behind the change drum 46.

Only one shift rod 45 is provided and three shift forks 76 are supported by the shift rod 45. Two of the shift forks 76 are extended to the transmission output shaft 43, and one shift fork 76 is extended to the transmission input shaft 42. The shift forks 76 are respectively in engagement with grooves of the shift sleeves 76*a* mounted on the input shaft 42 and the output shaft 43. A change shaft 47 is interconnected to a change pedal, and a swing arm 77 is connected to the change shaft 47 for rotating the change drum 46 at a prescribed pitch.

Above the transmission input shaft 42, a larger and a smaller starting intermediate gears 93, 94 are coaxially disposed. A starting motor 95 is disposed above the intermediate gears 93, 94. The larger starting intermediate gear 93 is in mesh with the pinion 96 of the starting motor 95, and the smaller stating intermediate gear 94 is in mesh with the starting gear 84 of the crank shaft 41 in the forward portion via a starting idle gear 97.

A balancer shaft 50 is disposed ahead of the crank shaft 41. A balancer gear 91 of the balancer shaft 50 is in mesh with a balancer drive gear 83 of the crank shaft 41.

Reverse Idle Gear and Arrangement of Shaft thereof

As shown in FIG. 3, the reverse idle gear shaft 44 is positioned, as viewed in a direction of the crank shaft center, below a line A2 interconnecting the transmission input shaft 42 and the transmission output shaft 43 and in the region surrounded by the crank shaft 41, the transmission input shaft 42, the transmission output shaft 43 and the change drum 46, more specifically in a region surrounded by the crank shaft center axis 01, the transmission input shaft center axis 02, the transmission output shaft center axis 03 and the change drum shaft center 05 (the region surrounded by lines A1, A2, A3 and A4). In the present embodiment, the reverse idle gear shaft 44 is positioned near the intersection between a vertical line A6 interconnecting the transmission input shaft center axis 02 and the change drum shaft center axis 05 and a horizontal line A5 interconnecting the transmission output shaft center axis 03 and the crank shaft center axis 01.

One reverse idle gear 90 is mounted rotatably on the reverse idle gear shaft 44. The reverse idle gear 90 is arranged, overlapping the shift rod 45, a part of the change drum 46 and a part of the crank web 49 (FIG. 8) of the crank shaft 41 as viewed in the direction of the crank shaft center.

Figure 4:
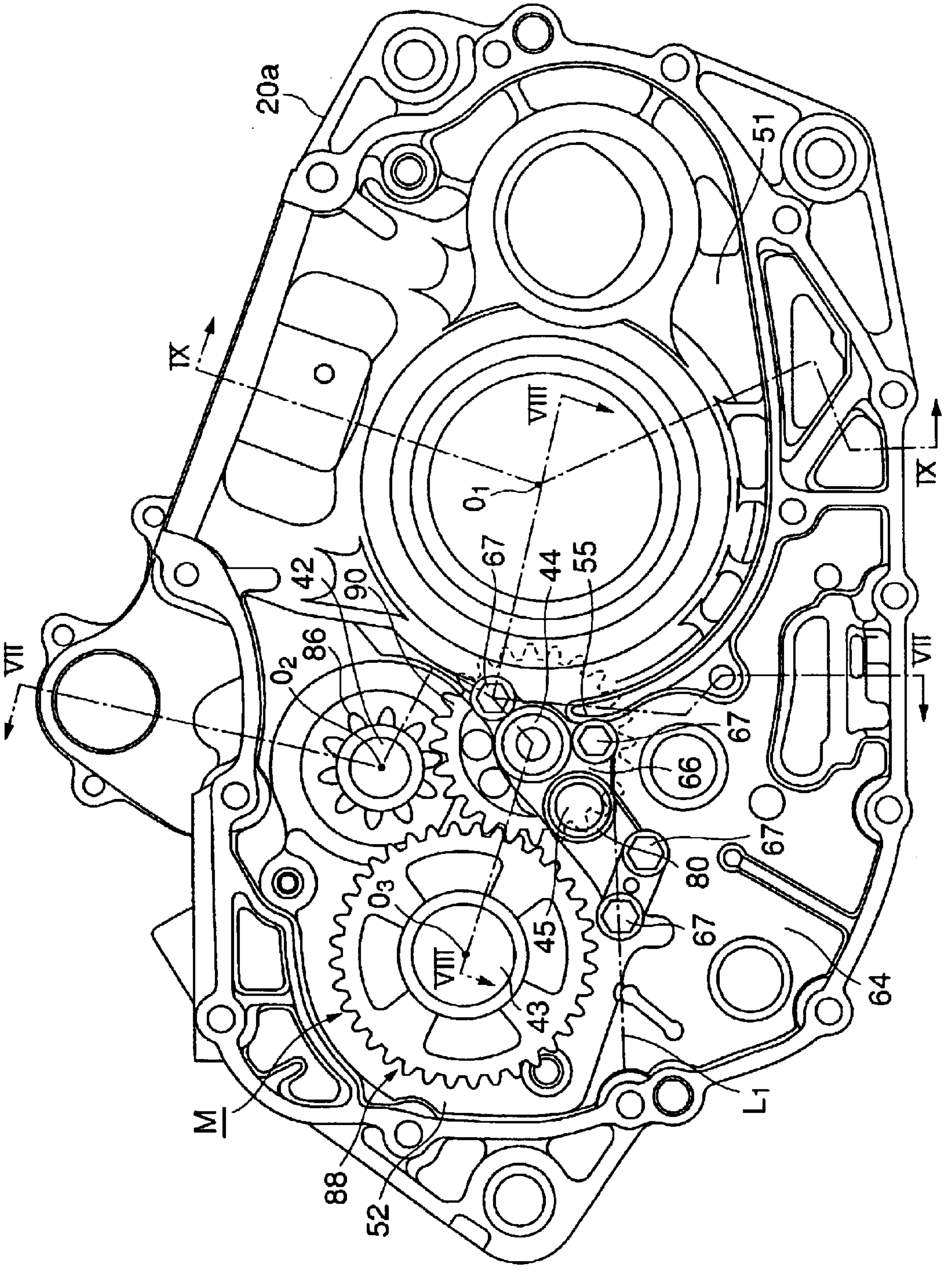
FIG. 4 is an inside view of a left crank case member with a reverse idle gear mounted.
Figure 5:
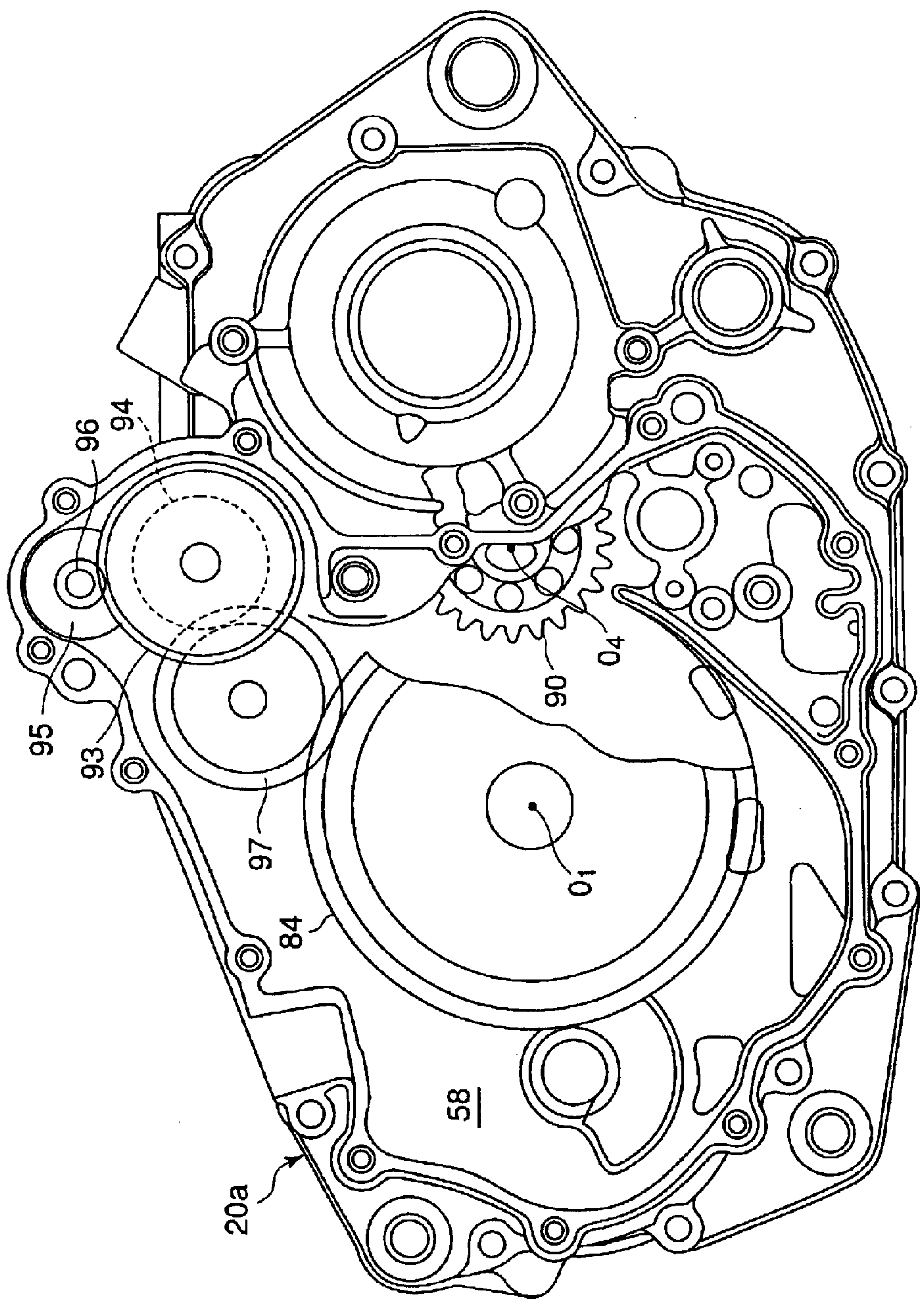
FIG. 5 is an outside view of the left crank case member with the reverse idle gear mounted.

FIG. 4 is an inside view of the left crank case member 20*a*. The reverse idle gear 90 is in mesh with the input reverse transmission gear 86 of the transmission input shaft 42 and the output reverse transmission gear 88 of the transmission output shaft 43.

Support Structure of Reverse Idle Gear Shaft

Figure 8:
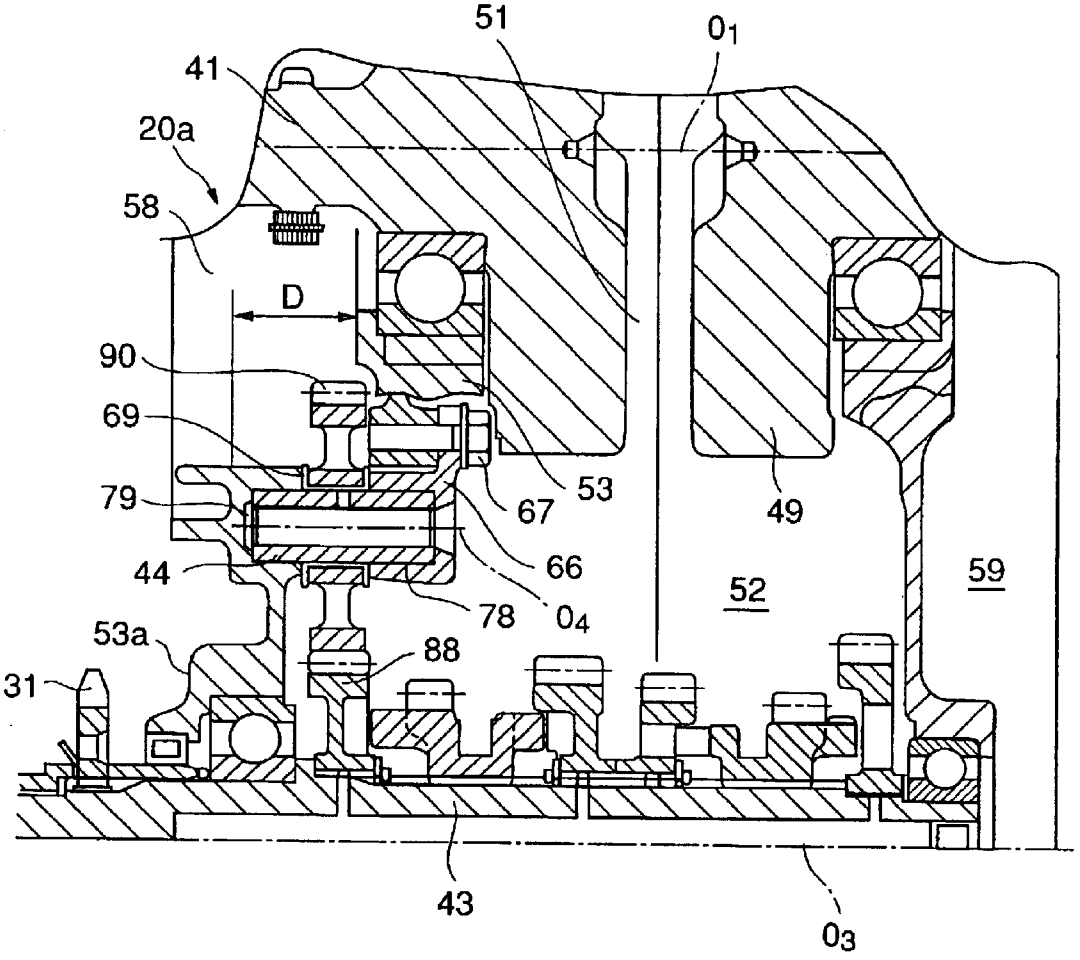
FIG. 8 is a sectional view along line VIII—VIII in FIG. 4.

FIG. 8 is a sectional view along line VIII—VIII in FIG. 4. A shaft support member 66 for supporting an reverse idle gear shaft is secured to the left end wall 53*a* of the mission chamber 52. A bearing recess 78 for supporting the reverse idle gear shaft 44 is formed in the shaft support member 66 and supports both ends of the reverse idle gear shaft 44 in cooperation with a bearing recess 79 formed in the left end wall 53*a* of the mission chamber 52. The reverse idle gear 90 is positioned inside the left bulged part of the mission chamber 52 and between the left end wall 53*a* of the mission chamber 52 and the shaft support member 66. The reverse idle gear 90 is supported rotatably on the reverse idle gear shaft 44.

The left end wall 53*a* of the mission chamber 52 is bulged to the left beyond the crank chamber 51 as described above, defining a step D in a direction of the crank shaft center with respect to the left end wall 53 of the crank chamber 51. A gear insertion hole 69 communicating the mission chamber 52 with the generator chamber 58 is formed in a partition wall forming the step D between the generator chamber 58 and the mission chamber 52. A half of the reverse idle gear 90 is projected through the gear insertion hole 69 toward the generator chamber 58.

As shown in FIG. 4, the shaft support member 66 is extended downward from the reverse idle gear shaft 44, and a shift rod support hole 80 is formed in the shaft support member 66 on the lower side.

Figure 6:
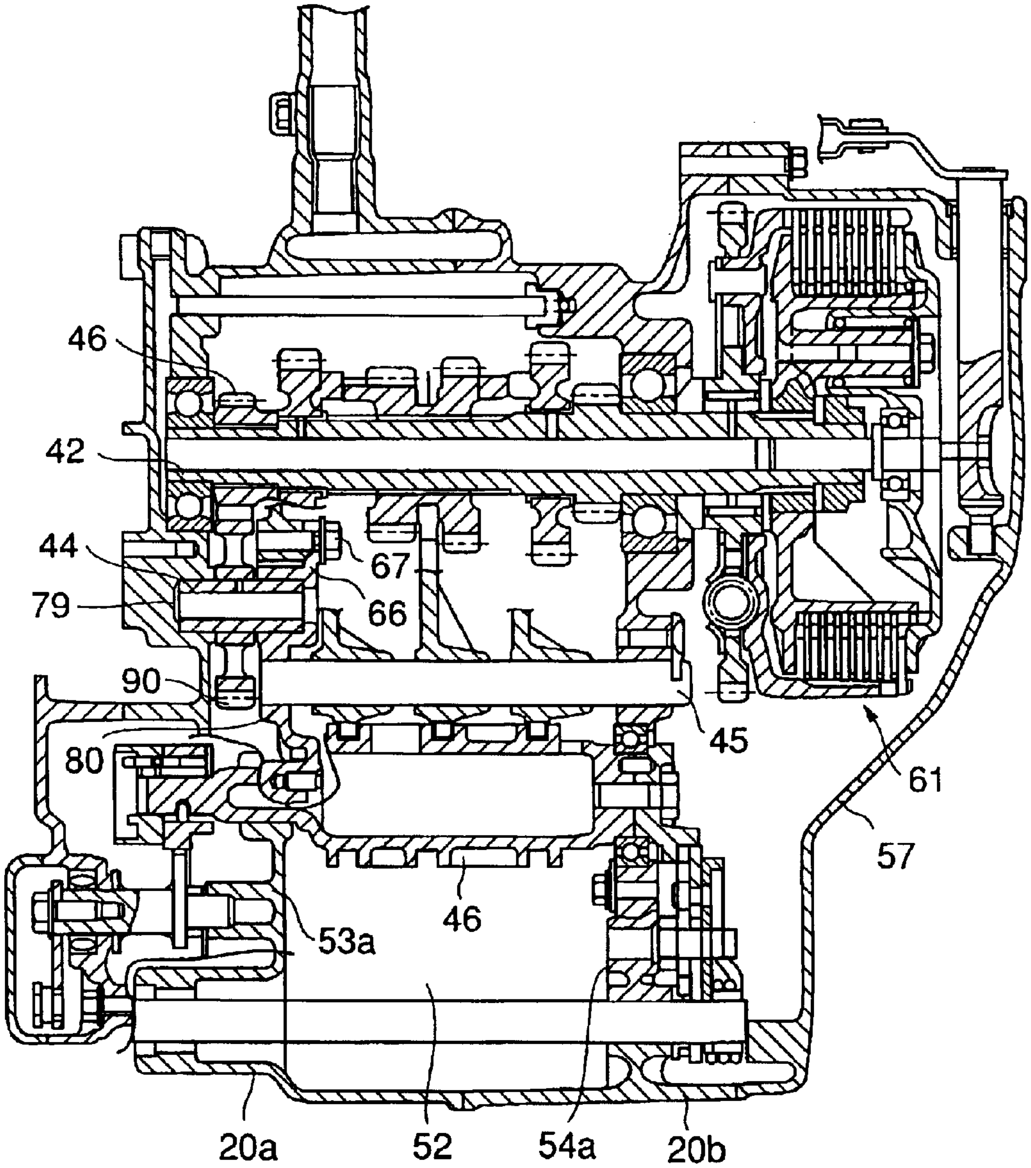
FIG. 6 is a sectional view along the line VI—VI in FIG. 3.

FIG. 6 is a sectional view along line VI—VI in FIG. 4. The left end of the shift rod 45 is inserted in a shift rod support hole 80 of the shaft support member 66, and the right end of the shift rod 45 is inserted in the right end wall 54*a* of the mission chamber 52.

Figure 7:
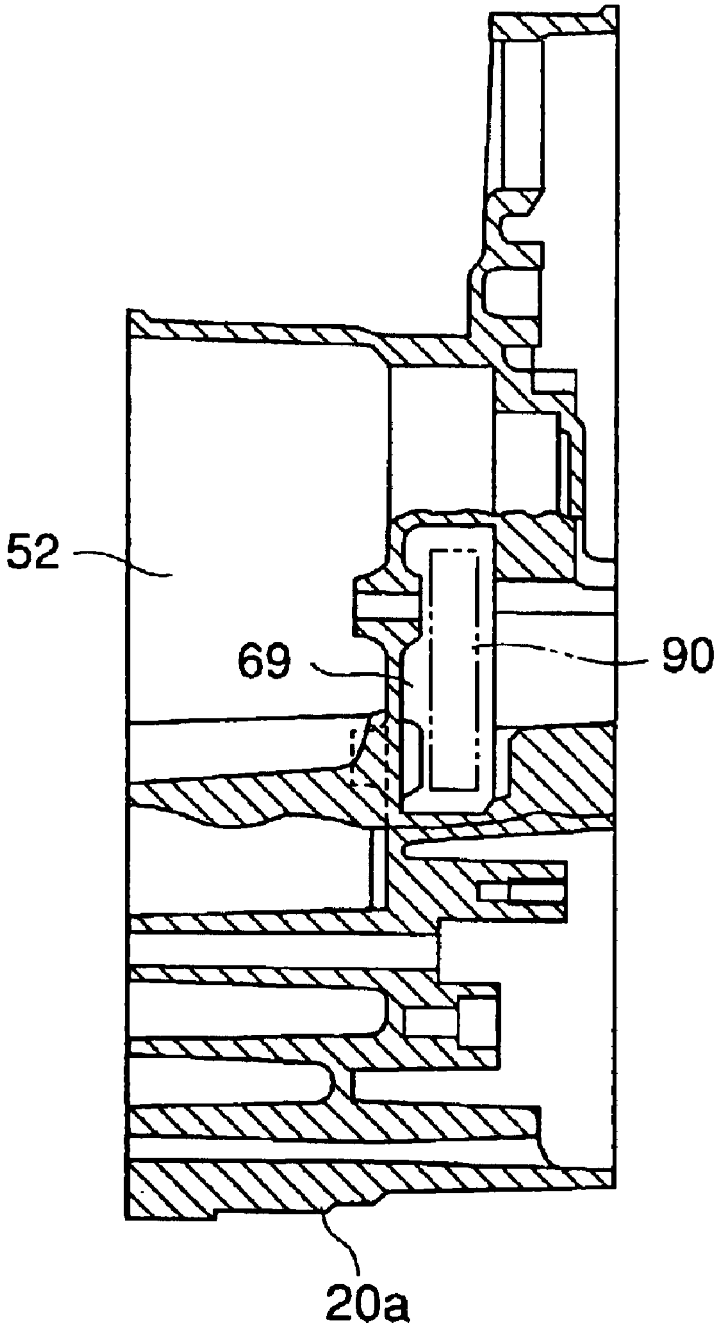
FIG. 7 is a sectional view along line VII—VII in FIG. 4.

FIG. 7 is a sectional view of the left side crankcase member 20*a* along line VII—VII in FIG. 4. The gear insertion hole 69 is formed in a size which permits the reverse idle gear 80 to be passed through.

Structure for Containing Oil

In the engine according to the present embodiment, as shown in FIG. 4, a partition wall 55 having a certain height is formed between the crank chamber 51 and the mission chamber 52. A lower part in the mission chamber 52 includes an oil tank chamber 64, so that a dry-sump type four-cycle engine having an oil tank in the crank case is formed. The reverse idle gear 90 of the mission M has the lower end positioned at a level where the lower end is immersed in oil (e.g., L1) in the oil tank chamber 64. The respective transmission gears mounted on the transmission output shaft 43 and the transmission input shaft 42 are positioned at a level where the respective transmission gears are not immersed in the oil.

Figure 9:
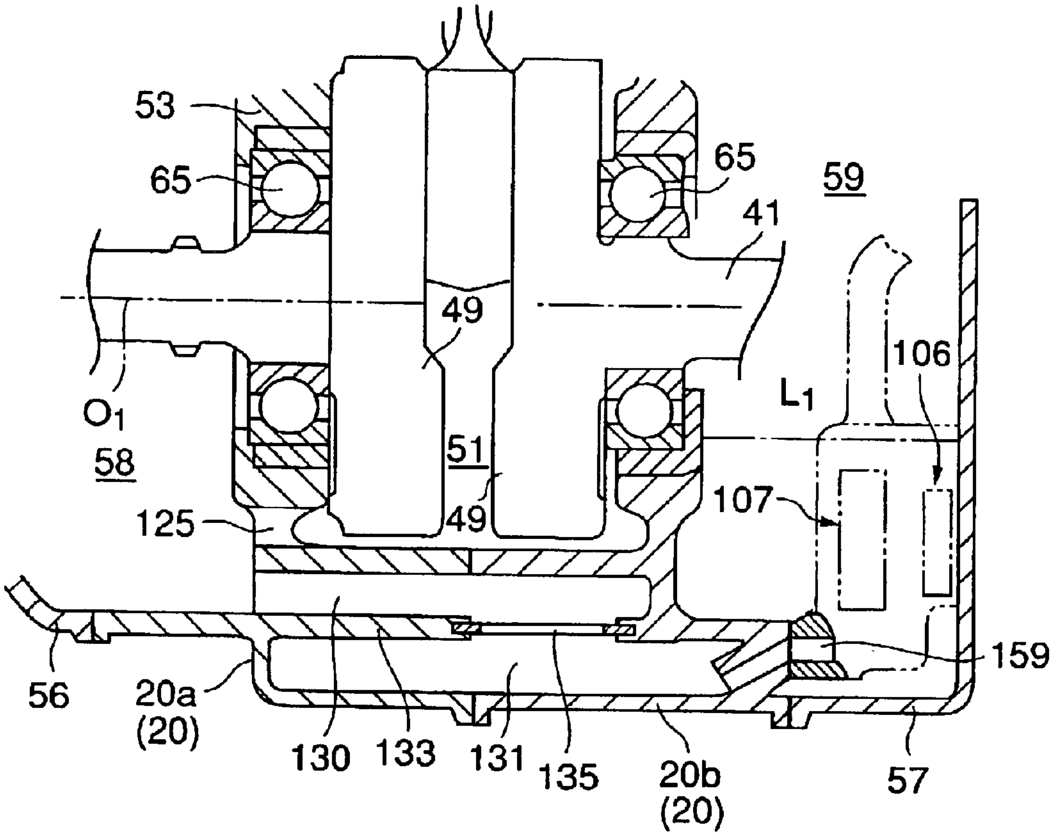
FIG. 9 is a sectional view along line IX—IX in FIG. 4.
Figure 10:
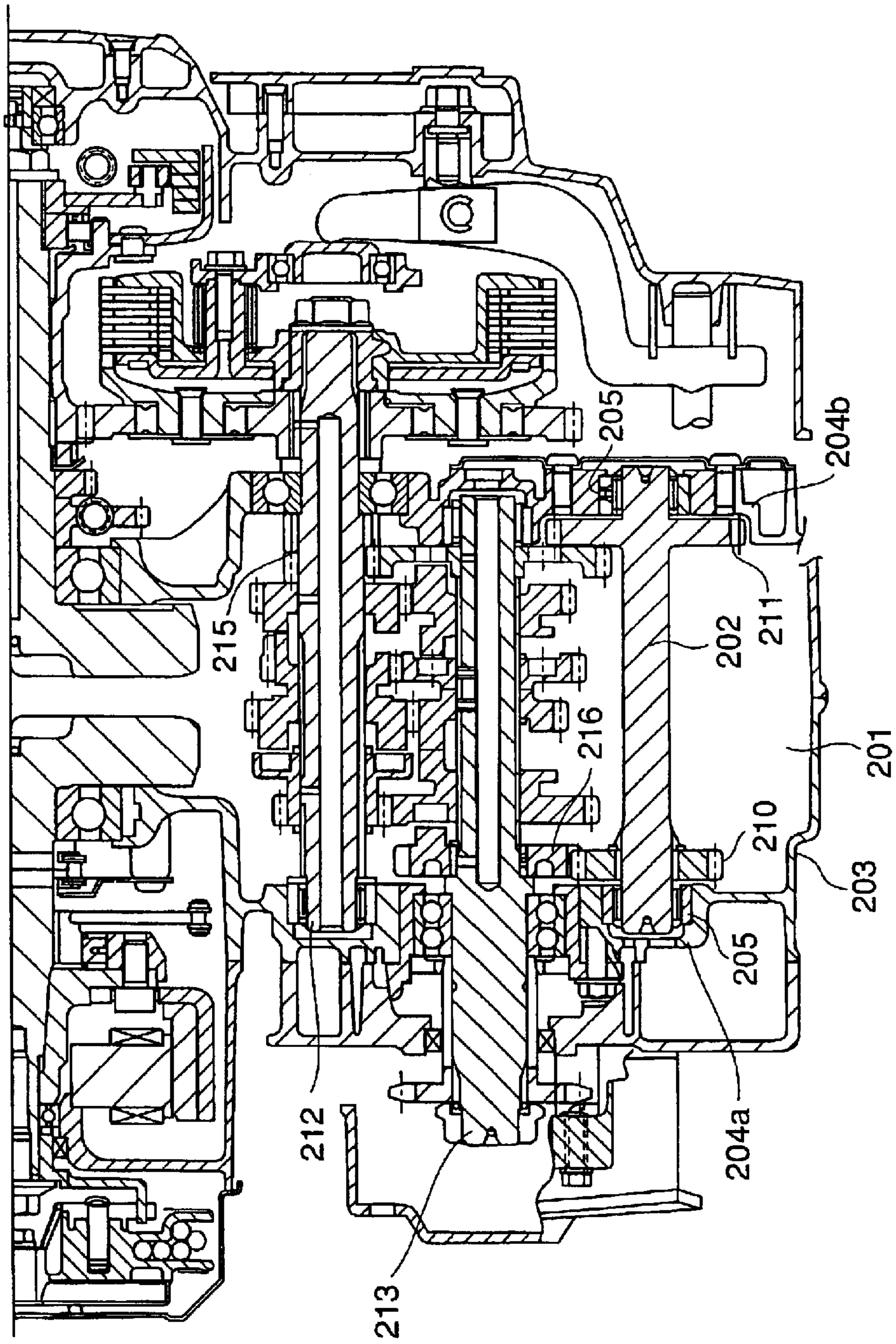
FIG. 10 PRIOR ART
FIG. 10 is a longitudinal sectional development of a conventional engine.

FIG. 9 is a sectional view along line IX—IX in FIG. 4. The generator chamber 58 is in communication with the crank chamber 51 through a bypass hole 125 and in communication with a suction port 159 of a scavenging pump 107 in the clutch chamber 59 through oil passages 130, 131 provided on the lower part of the crank chamber 51 and a plate-like filter 135. Thus, oil bypassed to the generator case 58 from the crank chamber 51 is sucked up by the scavenging pump 107 into the clutch chamber 59.

In the clutch chamber 59, a feed pump 106 is disposed coaxially with the scavenging pump 107 to pressure feed an oil in the oil tank chamber 64 to respective lubricated parts of the engine. The clutch chamber 59 is in communication with the oil tank chamber 64 in FIG. 4 through a communication hole (not shown) formed in the lower end of the clutch chamber 59 to store the oil at the same level as in the oil tank chamber 64.

Then, the operation of the present embodiment having the above constitution will be explained.

Mounting of Reverse Idle Gear and Reverse Idle Gear Shaft

In FIG. 8, the reverse idle gear shaft 44 is inserted in the reverse idle gear 90. Then, before the left and the right crank case members 2*a*, 20*b* are fastened to each other, the reverse idle gear shaft 44 is engaged into the bearing recess 79 of the left end wall 53*a* of the mission chamber while the bearing recess 78 of the shaft supporting member 66 is engaged with the right end of the reverse idle gear shaft 44. Then, the shaft support member 66 is secured to the left end wall 53*a* of the mission chamber by means of a bolt 67. That is, the reverse idle gear shaft 44 with the reverse idle gear 90 has both ends supported by the left end wall 53*a* of the mission chamber and the shaft supporting member 66 secured to the left end wall 53*a*.

With the reverse idle gear 90 and the reverse idle gear shaft 44 mounted on the left side crank case member 20*a* in advance, the left and the right crank case members 20*a*, 20*b* are fastened to each other while the respective rest shafts shown in FIG. 2 are being mounted. The generator 60 and the clutch 61 are mounted, and then the left and right covers 56, 57 are fixed to the crank case 20.

In an operation of the engine, when the mission M is shifted to the reverse position, a rotary force of the crank shaft 41 is transmitted from the crank gear 82 to the reverse idle gear 90 in FIG. 4 via the clutch gear 81, the clutch 61, the transmission input shaft 42 and the input reverse transmission gear 86. Then, the rotational force is transmitted from the reverse idle gear 90 to the output sprocket 31 in FIG. 1 via the output reverse transmission gear 88 and the transmission output shaft 43, and then to be is transmitted to the rear wheels 5 by the drive chain 34.

Next, modifications of the present invention will be explained.

(i) The shaft support member, the reverse idle gear shaft and the reverse idle gear may be provided on the right end wall of the mission chamber, the reverse idle gear shaft may have both ends supported by the right end wall and the shaft support member, and the reverse idle gear may be projected to be inside the right clutch chamber.

(ii) In the structure shown in FIG. 8, in which the reverse idle gear 90 is positioned at the left end part in the mission chamber 52, a hole is formed in the left end wall 53*a* of the mission chamber, or the reverse idle gear 90 is projected to the generator chamber 58, so that the substantially left half of the reverse idle gear 90 in the axial direction of the crank shaft is projected to the side of the generator chamber 59.

Although the invention has been described in its preferred embodiment with a certain degree of particularity, obviously many changes and variation are possible therein. It is therefore to be understand that the present invention may be practiced otherwise than as specifically described herein without departing from the scope and spirit thereof.

What is claimed is:

1. A vehicle engine comprising:

a crank case including a crank chamber and a transmission chamber;

a crank shaft disposed in the crank chamber;

a transmission gear mechanism disposed in the transmission chamber, including an reverse idle gear shaft and one reverse idle gear mounted on the idle gear shaft; and cover chambers housing a generator and a clutch being disposed respectively on both sides of the crank chamber in the direction of the crank shaft, the reverse idle gear having a part extended from the transmission chamber to one of the cover chambers.

2. The vehicle engine according to claim 1, wherein the transmission chamber is projected beyond the crank chamber toward one end of the crank shaft, and the reverse idle gear being disposed in the projected portion of the transmission chamber, and a gear insertion hole is formed in a partition wall between the transmission chamber and the cover chamber, and the part of the reverse idle gear is projected to the cover chamber through the gear insertion hole.

3. The vehicle engine according to claim 1, wherein a shaft support member is secured to an end wall of the transmission chamber on the side of one end of the crank shaft, and the reverse idle gear shaft with the reverse idle gear mounted thereon has both ends supported by the end wall of the transmission chamber and the shaft support member.

4. The vehicle engine according to claim 3, wherein the transmission gear mechanism further includes a shift rod, and the shift rod is supported by the shaft support member supporting the reverse idle gear shaft.

5. A vehicle engine comprising:

a crank case including a crank chamber and a transmission chamber;

a crank shaft having a center axis disposed in the crank chamber;

a transmission gear mechanism disposed in the transmission chamber and including a transmission output shaft having a center axis, a transmission input shaft having a center axis, a reverse idle gear shaft having a center axis with a reverse idle gear mounted thereon, and a change drum shaft having a center axis; and cover chambers housing a generator and a clutch being disposed respectively on both sides of the crank chamber in the direction of the crank shaft, the transmission input shaft being arranged one side of a straight line interconnecting the center axis of the crank shaft and the center axis of the transmission output shaft, and the change drum shaft being arranged on the other side of the straight line interconnecting the center axis of the crank shaft and the center axis of the transmission output shaft, and the reverse idle gear shaft is disposed in a region surrounded by the center axis of the crank shaft, the center axis the transmission output shaft, the center axis of the transmission input shaft and the center axis of the change drum shaft.

6. The vehicle engine according to claim 5, wherein the reverse idle gear shaft and the change drum shaft are arranged below a straight line interconnecting the transmission input shaft and the transmission output shaft.

7. The vehicle engine according to claim 6, wherein the transmission gear mechanism includes a shift rod, and the reverse idle gear is arranged, partially overlapping the shift rod and a change drum provided on the change drum shaft as viewed in the direction of the crank shaft.

8. The vehicle engine according to claim 6, wherein a shaft support member is secured to an end wall of the transmission chamber on the side of one end of the crank shaft, the reverse idle gear shaft with an reverse idle gear mounted thereon has both ends supported by the end wall of the transmission chamber and the shaft support member, and the shift rod is supported by the shaft support member.

9. The vehicle engine according to claim 8, wherein the reverse idle gear of the reverse idle gear shaft has a part projected out of the transmission chamber into the cover chamber housing the generator.

10. The vehicle engine according to claim 7, wherein the transmission input shaft and the transmission output shaft have respective shift sleeves for shifting the gears, and shift forks which are engaged with the shift sleeves of the transmission input shaft and the transmission output shaft, are mounted on said shift rod.

* * * * *